US008908846B2

(12) United States Patent
Siegel et al.

(10) Patent No.: US 8,908,846 B2
(45) Date of Patent: Dec. 9, 2014

(54) SYSTEM TO CAPTURE COMMUNICATION INFORMATION

(75) Inventors: Ian Siegel, Venice, CA (US); Mark C. Eastwood, Santa Monica, CA (US); Eric Hammond, Santa Monica, CA (US)

(73) Assignee: Viva Group, LLC, Los Angeles, CA (US)

( * ) Notice: Subject to any disclaimer, the term of this patent is extended or adjusted under 35 U.S.C. 154(b) by 2213 days.

(21) Appl. No.: 11/158,916

(22) Filed: Jun. 22, 2005

(65) Prior Publication Data

US 2007/0003038 A1  Jan. 4, 2007

(51) Int. Cl.
*H04M 3/42* (2006.01)
*H04M 15/00* (2006.01)

(52) U.S. Cl.
CPC ..................................... *H04M 15/00* (2013.01)
USPC ..................... 379/209.01; 379/201.01; 705/34

(58) Field of Classification Search
USPC .................. 379/201.01, 201.11, 202.01, 158, 379/142.01–142.07, 209.01; 705/26.1, 34
See application file for complete search history.

(56) References Cited

U.S. PATENT DOCUMENTS

| | | | |
|---|---|---|---|
| 5,032,989 A | 7/1991 | Tornetta | |
| 5,283,731 A | 2/1994 | Lalonde et al. | |
| 5,584,025 A | 12/1996 | Keithley et al. | |
| 5,664,115 A | 9/1997 | Fraser | |
| 5,717,989 A | 2/1998 | Tozzoli et al. | |
| 5,736,977 A | 4/1998 | Hughes et al. | |
| 5,754,850 A | 5/1998 | Janssen | |
| 5,794,207 A | 8/1998 | Walker et al. | |
| 5,794,210 A | 8/1998 | Goldhaber et al. | |
| 5,812,670 A | 9/1998 | Micali | |
| 5,818,836 A * | 10/1998 | DuVal | 370/389 |
| 5,884,272 A | 3/1999 | Walker et al. | |
| 5,905,944 A | 5/1999 | Goldman et al. | |
| 6,061,660 A | 5/2000 | Eggleston et al. | |
| 6,131,087 A | 10/2000 | Luke et al. | |
| 6,230,188 B1 * | 5/2001 | Marcus | 709/206 |
| 6,272,467 B1 | 8/2001 | Durand et al. | |

(Continued)

FOREIGN PATENT DOCUMENTS

| | | |
|---|---|---|
| WO | WO-2007002489 A2 | 1/2007 |
| WO | WO-2007002489 A3 | 1/2007 |
| WO | WO-2007129089 A1 | 11/2007 |

OTHER PUBLICATIONS

"EHarmony Expert Guidance", http://www.eharmony.com, Home page plus communication guidelines information,(Copyright 2000-2005),n. pag.

(Continued)

*Primary Examiner* — William Deane, Jr.
(74) *Attorney, Agent, or Firm* — King & Spalding

(57) ABSTRACT

Apparatuses and methods to mask identification information to create billing mechanisms in an online listing system are disclosed. In one embodiment, a computer-implemented method of operating an online listing system includes determining an identity of a user based on an identifier entered by the user that uniquely identified the user; and capturing call history information when routing a proxy telephone number from the user (e.g., a renter, a buyer, a prospective buyer, a mortgagor, etc.) to a lister (e.g., a landlord, a seller, a rental manager, a mortgagee, etc.). The identifier may be the proxy telephone number and/or a code entered after dialing the proxy telephone number. The proxy telephone number may be converted to an actual telephone number prior to routing the proxy telephone number to the lister.

32 Claims, 7 Drawing Sheets

(56) References Cited

U.S. PATENT DOCUMENTS

| | | | |
|---|---|---|---|
| 6,289,224 B1* | 9/2001 | Boxall et al. | 455/517 |
| 6,434,532 B2 | 8/2002 | Goldband et al. | |
| 6,594,633 B1 | 7/2003 | Broerman | |
| 6,603,844 B1* | 8/2003 | Chavez et al. | 379/114.13 |
| 6,665,389 B1* | 12/2003 | Haste, III | 379/196 |
| 6,684,196 B1 | 1/2004 | Mini et al. | |
| 7,120,235 B2 | 10/2006 | Altberg et al. | |
| 7,222,105 B1 | 5/2007 | Romansky | |
| 7,246,067 B2* | 7/2007 | Austin et al. | 705/1 |
| 7,359,498 B2* | 4/2008 | Faber et al. | 379/210.01 |
| 7,450,711 B2* | 11/2008 | Agapi et al. | 379/215.01 |
| 7,890,375 B2* | 2/2011 | Schwankl et al. | 705/26.8 |
| 7,937,293 B2* | 5/2011 | Raccah et al. | 705/26.1 |
| 8,112,329 B2* | 2/2012 | Canning et al. | 705/34 |
| 8,117,081 B2* | 2/2012 | Raccah et al. | 705/26.1 |
| 2001/0026609 A1* | 10/2001 | Weinstein et al. | 379/93.01 |
| 2002/0029193 A1* | 3/2002 | Ranjan et al. | 705/39 |
| 2002/0040319 A1 | 4/2002 | Brauer | |
| 2002/0077130 A1* | 6/2002 | Owensby | 455/466 |
| 2003/0174821 A1 | 9/2003 | Bates et al. | |
| 2003/0229504 A1* | 12/2003 | Hollister | 705/1 |
| 2005/0125261 A1 | 6/2005 | Adegan | |
| 2005/0144121 A1 | 6/2005 | Mayo | |
| 2005/0149432 A1* | 7/2005 | Galey | 705/38 |
| 2006/0004647 A1 | 1/2006 | Srinivasamurthy et al. | |
| 2006/0010476 A1* | 1/2006 | Kelly et al. | 725/86 |
| 2006/0059055 A1 | 3/2006 | Lin | |
| 2006/0149633 A1* | 7/2006 | Voisin et al. | 705/14 |
| 2006/0182069 A1* | 8/2006 | Yu | 370/335 |
| 2007/0016921 A1* | 1/2007 | Levi et al. | 725/35 |
| 2007/0033103 A1 | 2/2007 | Collins et al. | |
| 2007/0067297 A1 | 3/2007 | Kublickis | |
| 2007/0118592 A1* | 5/2007 | Bachenberg | 709/203 |
| 2007/0198443 A1* | 8/2007 | Chernev et al. | 705/500 |
| 2008/0097838 A1 | 4/2008 | Lin et al. | |
| 2010/0061546 A1* | 3/2010 | Weiss et al. | 379/418 |

OTHER PUBLICATIONS

"Match.com Overview and Communication", http://www.match.com, Home page and communication explanation.,(Copyright 2005),n. pag.

"Ziprealty", http://www.ziprealty.com, Homepage, real estate listing and contact information for real estate agent,(Copyright 1999-2005),n. pag.

"Adserver Solutions: Features of Ad Server Solutions", [Online]. Retrieved from the Internet: <URL: http://www.adserversolutions.com/ad_management/features.html>, (Jul. 2, 2008), 7 pgs.

U.S. Appl. No. 09/802,719 Non-Final Office Action mailed Dec. 21, 2007, 19 pgs.

U.S. Appl. No. 09/802,719 Final Office Action mailed Aug. 8, 2008, 10 pgs.

U.S. Appl. No. 09/802,719 Response filed Mar. 31, 2008 to Non-Final Office Action mailed Dec. 31, 2007, 17 pgs.

U.S. Appl. No. 09/802,719 Response filed Oct. 28, 2007 to Final Office action mailed May 29, 2007, 17 pgs.

U.S. Appl. No. 09/802,719 Response filed Dec. 8, 2008 to Final Office Action mailed Aug. 8, 2008, 14 pgs.

U.S. Appl. No. 09/802,719 Non-Final Office Action mailed Feb. 10, 2009, 15 pgs.

U.S. Appl. No. 09/802,719, Examiner Interview Summary mailed Oct. 28, 2007, 1 pg.

U.S. Appl. No. 09/802,719, Examiner Interview Summary mailed Dec. 8, 2008, 2 pgs.

U.S. Appl. No. 09/802,719, Final Office Action mailed May 29, 2007, 12 pgs.

U.S. Appl. No. 09/802,719, Final Office Action mailed Jul. 22, 2009, 12 pgs.

U.S. Appl. No. 09/802,719, Non Final Office Action mailed Mar. 23, 2006, 10 pgs.

U.S. Appl. No. 09/802,719, Non Final Office Action mailed Dec. 1, 2006, 11 pgs.

U.S. Appl. No. 09/802,719, Notice of Allowance mailed Mar. 24, 2010, 6 pgs.

U.S. Appl. No. 09/802,719, Response filed Jan. 11, 2010 to Restriction Requirement mailed Dec. 10. 2009, 9 pgs.

U.S. Appl. No. 09/802,719, Response filed Mar. 1, 2007 to Non Final Office Action mailed Dec. 1, 2006, 18 pgs.

U.S. Appl. No. 09/802,719, Response filed May 11, 2009 to Non Final Office Action mailed Feb. 10, 2009, 15 pgs.

U.S. Appl. No. 09/802,719, Response filed Aug. 21, 2006 to Non Final Office Action mailed Mar. 23, 2006, 18 pgs.

U.S. Appl. No. 09/802,719, Response filed Sep. 22, 2009 to Final Office Action mailed Jul. 22, 2009, 9 pgs.

U.S. Appl. No. 09/802,719, Restriction Requirement mailed Dec. 10, 2009, 6 pgs.

"U.S. Appl. No. 09/802,719, Response filed Dec. 8, 2008 to Final Office Action mailed Aug. 8, 2008", 14 pgs.

"U.S. Appl. No. 12/346,754, Response filed Jun. 29, 2011 to Non Final Office Action mailed May 26, 2011", 15 pgs.

"International Application Serial No. PCT/US2006/024625, International Preliminary Report on Patentability mailed Jan. 10, 2008", 5 pgs.

"International Application Serial No. PCT/US2006/024625, International Search Report and Written Opinion mailed Sep. 19, 2007", 10 pgs.

"U.S. Appl. No. 12/346,751, Non Final Office Action mailed May 26, 2011", 9 pgs.

* cited by examiner

| USER SIDE (ext. 1511) 400 | | | | | | | | | LISTER SIDE (800-555-2100) 402 | | | | | | | |
|---|---|---|---|---|---|---|---|---|---|---|---|---|---|---|---|---|
| ACTUAL 404 | | | | MASKED 406 | | | | ACTUAL 408 | | | | MASKED 410 | | | | |
| PHONE | FAX | EMAIL | OTHER(S) | PHONE | FAX | EMAIL | OTHER(S) | PHONE | FAX | EMAIL | OTHER(S) | PHONE | FAX | EMAIL | OTHER(S) | |
| 555-1111 | 111-1155 | raj@slwk.com | X | 222-8411 | 348-2400 | raj@rent.com | X' | 777-1111 | 777-1155 | joe@y.com | Z | 888-2411 | 888-1155 | joe@rent.com | Z' | ← MASK TABLE 114 |
| . | . | . | . | . | . | . | . | . | . | . | . | . | . | . | . | |
| . | . | . | . | . | . | . | . | . | . | . | . | . | . | . | . | |
| . | . | . | . | . | . | . | . | . | . | . | . | . | . | . | . | |
| . | . | . | . | . | . | . | . | . | . | . | . | . | . | . | . | |
| . | . | . | . | . | . | . | . | . | . | . | . | . | . | . | . | |
| . | . | . | . | . | . | . | . | . | . | . | . | . | . | . | . | |
| . | . | . | . | . | . | . | . | . | . | . | . | . | . | . | . | |

SYSTEM TO CAPTURE COMMUNICATION INFORMATION

FIELD OF TECHNOLOGY

This disclosure relates generally to the technical fields of software programming, networking, social and/or computer networks, and in one example embodiment, to an apparatus and a method to mask identification information to create billing mechanisms in an online listing system.

BACKGROUND

The emergence of an online listing system (e.g., such as eBAY®, Amazon®, and Rent.com® in which goods/services are offered to interested parties) has created new opportunities for a service provider to monetize transactions made between a user (e.g., a renter, a buyer, a prospective buyer, a mortgagor, etc.) and a lister (e.g., a landlord, a seller, a rental manager, a mortgagee, etc.) connected through the online listing system. It is important for the service provider to first identify when a transaction has been made between the user and the lister.

Numerous techniques exist for the service provider (e.g., an operator of the online listing system) to discover the transaction between the user and the lister when the user and the lister communicate via the Internet (e.g., through email, instant messenger, etc.). For example, the service provider can discover the transaction by monitoring and/or reading emails between the user and the lister when they communicate with each other through emails sent to each other through the online listing system. Once the transaction is discovered, the service provider can charge the user and/or the lister with a transaction fee (e.g., such as a fee when a particular property has been rented through a website such as Rent.com®).

In many scenarios, the user and the lister transact over the telephone (e.g., through telephone calls between the user to/from the lister). In these scenarios, the service provider must rely on manual methods to discover the transaction, as numerous technical challenges exist in the circuit switched telephone network to verify when and from whom a call has been made (e.g., the user and/or the lister may have caller ID blocking, the user may use multiple phones to call the lister, reconciling and integrating to an online database from data collected through a circuit switched network is inefficient/delayed, etc.). In one approach, the service provider may manually discover the transaction by calling the user and/or the seller and soliciting information about the nature of their relationship and/or whether they entered into the transaction (e.g., by offering monetary and/or non-monetary incentives to the user/lister to report transactions).

The service provider may have to hire expensive and trained staff to call the user and/or the lister and manually and ask them about whether a successful transaction was made (e.g., did the sale go through, how long was the response time, etc.). In addition, sometimes the user and/or the lister may resist paying the transaction fee without accurate justification from the service provider that the transaction was made possible through the online listing system (e.g., the user and/or the lister may want proof that they were first introduced to each other through the online listing system). The trained staff of the service provider may not be able to contact the user and/or the lister (e.g., via telephone/email) because their phone numbers and/or email addresses may have changed and/or the parties may be uncooperative (e.g., agreements between the user and the lister to sidestep a rebate payment to the service provider). As such, these manual methods are labor-intensive, expensive, difficult to justify, inaccurate, and incomplete.

SUMMARY

Apparatuses and methods to capture communication information are disclosed. In one aspect, a computer-implemented method of operating an online listing system includes determining an identity of a user based on an identifier entered by the user that uniquely identifies the user; and capturing call history information when routing a proxy telephone number from the user (e.g., a renter, a buyer, a prospective buyer, a mortgagor, etc.) to a lister (e.g., a landlord, a seller, a rental manager, a mortgagee, etc.).

The identifier may be the proxy telephone number and/or a code entered after dialing the proxy telephone number. The proxy telephone number may be converted to an actual telephone number prior to routing the proxy telephone number to the lister. The call history information may include at least one of the identity of the user, a duration of a routed call, a time-and-day of the routed call, and a particular listing requested by the user. The computer-implemented method may include transmitting additional information to the user about the particular listing based on the duration of the routed call. The proxy telephone number may be unique to a particular listing requested by the user, and the code may be unique to the user.

The particular listing may be associated with an item detail page in the online listing system, and the user may contact the lister through the proxy telephone number, a proxy fax number, and/or a website lead form on the item detail page. The method may include validating a transaction between the user and the lister based on the call history information, the proxy fax number, and/or the website lead form. In addition, a charge may be justified to the user and the lister based on the call history information, the proxy fax number, and/or the website lead form.

Similarly, a call may be routed from the proxy fax number to an actual fax number through the online listing system. An actual email address of the user entered in the website lead form may be converted to a proxy email address; and may be transmitted to the lister. In addition, a call of the user may be received from multiple geographic sites prior to determining the identity of the user based on the identifier entered by the user that uniquely identifies the user. The identifier may be generated based on a logic algorithm having a checksum; and a bill may be generated to the lister for each different user routed call to the lister based on the identifier.

In another aspect, a computer-implemented method includes generating a telephone number to uniquely identify a listing of an online listing system; generating a telephone extension to uniquely identify a user of the online listing system; and associating the telephone extension with the telephone number based on a registration of the user on the online listing system. A periodic log of telephone numbers dialed between users (e.g., the user 100 and other users) of the online listing system and a lister may be optionally provided.

In a further aspect, a computer-implemented method includes identifying a lister response to a user based on an identifier entered by a lister that uniquely identifies the user; and capturing response history information when routing a proxy telephone number from the lister to the user. The identifier may be the proxy telephone number. The identifier may also be a code entered after dialing the proxy telephone number. The proxy telephone number may be unique to a particular listing requested by the user, and the code may be unique to the user.

In yet a further aspect, an apparatus includes a transaction center server to identify a lister response to a user based on a code entered by the lister after dialing a proxy telephone number; and a billing module to capture a response history information when routing the proxy telephone number to the user. The code may be an extension entered after dialing the masked user telephone number. A timing module may determine how long the lister of the online listing system took to respond to the user. In addition, a mask module may determine an identity of the user dialing a proxy telephone number based on an extension number entered by the user, and wherein the transaction center server to capture call history information when routing the proxy telephone number to the lister. A mask removal module may convert the proxy telephone number to an actual telephone number prior to routing the proxy telephone number to the lister.

Other features of the present embodiments will be apparent from the accompanying drawings and from the detailed description that follows.

BRIEF DESCRIPTION OF THE DRAWINGS

Embodiments are illustrated by way of example and not limitation in the figures of the accompanying drawings, in which like references indicate similar elements and in which:

FIG. 4 is a table view of the mask table of FIG. 1, according to an example embodiment.

DETAILED DESCRIPTION

Apparatuses and methods to capture communication information are disclosed. In the following description, for purposes of explanation, numerous specific details are set forth in order to provide a thorough understanding of the various embodiments. It will be evident, however, to one skilled in the art that the various embodiments may be practiced without these specific details. An example embodiment provides methods and systems to mask identification information to create billing mechanisms in an online listing system (e.g., such as eBAY®, Amazon®, and Rent.com® in which goods/services are offered to interested parties). A method and a system are described below, as example embodiments, to determine, to capture, to process, to identify, to generate, to associate, and to bill various parties involved in the online listing system. It will be appreciated that the various embodiments discussed herein may/may not be the same embodiment, and may be grouped into various other embodiments not explicitly disclosed herein.

Figure 1:
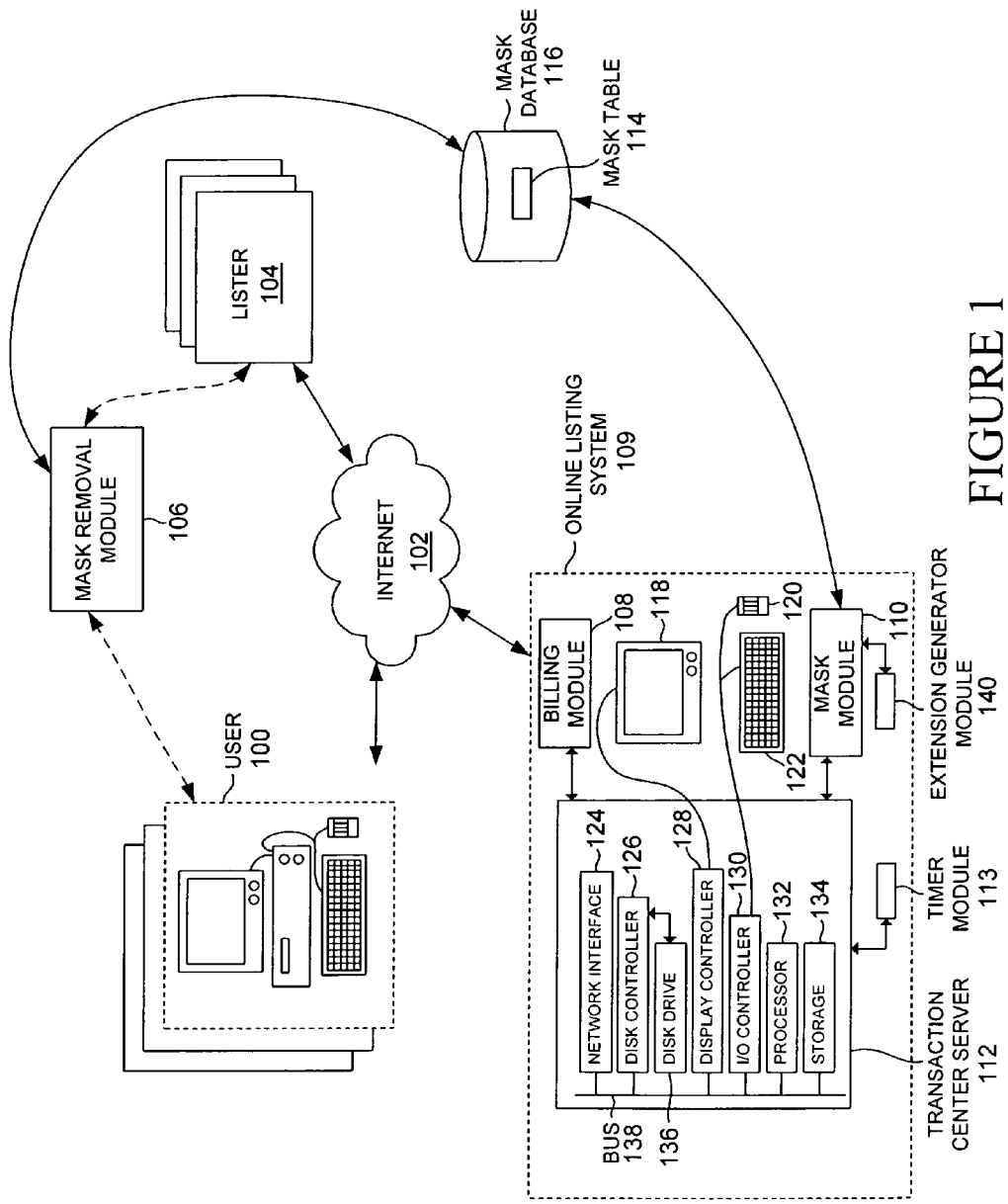
FIG. 1 is a block diagram illustrating an online listing system associated with a mask table and is connected to a user and a lister through a network according to an example embodiment.

FIG. 1 is a system view of an online listing system 109 associated with a mask table 114 and connected to a user 100 and a lister 104 through a network (e.g., an Internet 102) according to an embodiment. The user 100 communicates with the lister 104 through the Internet 102 (e.g., by accessing and searching on an online listing system such as Rent.com®), in an example use scenario. In addition, the user 100 may directly communicate with the lister 104 offline through a telephone conversation (e.g., through a mask removal module 106). The mask removal module 106 may reside anywhere in the telephone network (e.g., a circuit switched and/or IP network), and serve as a gateway for offline communications between the user 100 and the lister 104. For example, the mask removal module 106 may reverse the encoding of a phone number that is 'masked' or encoded by a mask module 110 of the online listing system 109 (e.g., as later will be described in detail in FIG. 5).

A transaction center server 112 (e.g., a transaction center server associated with the online listing system 109) may communicate with a billing module 108 and a mask module 110 connected to the transaction center server 112. The transaction center server 112 may also be connected to a display device 118, an input device 122, and a mouse 120, according to an embodiment illustrated in FIG. 1. The transaction center server 112 (e.g., a computer system) includes a network interface 124, a disk controller 126, a disk drive 136, a display controller 128, an I/O controller 130, a processor 132 (e.g., a microprocessor), and a storage 134 (e.g., a hard drive, a dynamic random access memory, and/or a flash memory, etc.) connected to each other through a bus 138 according to an embodiment illustrated in FIG. 1. The I/O controller 130 connects the transaction center server 112 to the input device 122 and the mouse 120 according to the embodiment of FIG. 1.

The mask module 110 of the online listing system 109 may generate unique telephone extensions to identify different users (e.g., such as the user 100) of the online listing system using an extension generator module 140. A particular extension generated by the extension generator module 140 may be visible in each listing visited by the user 100 in the online listing system (e.g., each property visited by the user 100 in an online listing system for property rentals). Similarly, the mask module 110 may determine a proxy telephone number (e.g., a substitute phone number to mask an actual telephone number) for each listing posted in the online listing system 109 (e.g., every property posted by a rental manager on the online listing system).

When the user 100 calls in connection with a particular listing, the mask module 110 may determine an identity of the user 100 dialing the proxy telephone number (e.g., by consulting a mask table 114) based on an extension number entered by the user 100 (e.g., an extension number previously generated by an extension generator module 140 connected to the mask module 110). Based on this identity determination, the mask module 110 may update data in the storage 134 associated with the billing module 108 (e.g., to track a particular call and later bill the lister 104 and/or the user 100).

The mask module 110 may consult a mask table 114 of the mask database 116 (e.g., the mask database 116 may be stored in the storage 134 and/or external to the transaction center server 112 in various embodiments). In addition, the mask module 110 may communicate with the mask removal module 106 and permit the mask removal module 106 to convert the proxy telephone number to an actual telephone number of the lister 104 and route a call from the user 100 to the lister 104. The mask removal module 106 may then route the proxy telephone number to the lister 104 from the user 100 after the conversion is made according to an embodiment.

A detailed view of the mask table 114 is illustrated in FIG. 4. The mask table 114 as illustrated in FIG. 4 includes a user side data 400 (e.g., the user illustrated having a unique extension 1511) and a lister side data 402 (e.g., the lister illustrated as having a unique phone number 800-555-2100). The user side data 400 includes actual user data 404 (e.g., actual phone numbers, fax, email, and other information about a user such as the user 100 as shown in FIG. 1), and masked user data 406 (e.g., masked/proxy phone numbers, fax, email, and other information about a user such as the user 100 as shown in FIG. 1). The masked user data 406 may be generated by the mask module 110 according to one embodiment.

Similarly, in FIG. 4, the lister side data 402 includes an actual lister data 408 (e.g., actual phone numbers, fax, email, and other information about a lister such as the lister 104), and a masked lister data 410 (e.g., masked/proxy phone numbers, fax, email, and other information about a lister such as the lister 104 as shown in FIG. 1). The masked lister data 410 may also be generated by the mask module 110 according to one embodiment. Referring now to FIG. 1, the mask table 114 may be used by the mask module 110 to convert actual contact information associated with the user 100 to masked information and/or vise versa. In addition, mask table 114 may be used by the mask removal module 106 to convert a proxy telephone number associated with the lister 104 to an actual telephone number of the lister 104 and/or vise versa.

For example, the mask removal module 106 (e.g., may be in a circuit switched telephone network and/or in an IP network such as the Internet 102) may reference the mask table 114 of FIG. 4 to convert the proxy telephone number (e.g., as previously generated by the mask module 110) of the lister 104 to an actual telephone number of the lister 104 based on a phone number entered. In addition, the mask removal module 106 may reference the mask table 114 to identify a particular user based on a code (e.g., an extension) entered by the lister 104 wishing to contact the user 100 via telephone according to an embodiment.

Referring back to FIG. 1, the online listing system 109 may identify a lister response (e.g., a rental manager following up on a lead received through the online listing system) to the user 100 (e.g., a user of the online listing system such as a potential renter of an apartment) based on a code (e.g., the code may be an extension entered after dialing a masked user telephone number such as a proxy telephone number) entered by the lister 104 after dialing a proxy telephone number (e.g., a 'masked' telephone number generated by the mask module 110 and substituting for the actual telephone number of the user 100), according to an embodiment. In addition, the billing module 108 of FIG. 1 may capture response history information when routing the proxy telephone number to the user 100.

In one embodiment, a timer module 113 (e.g., code executed by the processor 132 of the transaction center server 112) may determine how long the lister 104 of the online listing system took to respond to an inquiry from the user 100. The online listing system 109 may also record one or more telephone calls between the user 100 and the lister 104 based on a contract (e.g., a binding agreement) between the user 100 and the lister 104 with a proprietor of the online listing system (e.g., an online listing system 109). The lister may be rental manager, a landlord, a mortgage broker, and a merchant, according to various embodiments. In addition, the transaction center server 112 may provide to the billing module 108 a periodic log of telephone numbers dialed between users of the online listing system such as the user 100 and, other users of the online listing system 109 and the lister 104.

In one embodiment, a proxy telephone number generated by the mask module 110 is unique to a particular listing (e.g., a particular item or service offered for sale and/or lease) requested by the user 100, and the extension number (e.g., a telephone extension number) is unique to the user 100. The transaction center server 112 may send to the user 100 additional information about the particular listing based on the duration (e.g., amount of time) of the routed call. Every listing in the online listing system 109 may be associated with an item detail page (e.g., detailed information about a property for lease and/or sale) in the online listing system 109. The user 100 may contact the lister 104 through the proxy telephone number, a proxy fax number visible on the online listing system 109, and/or a website lead form on the item detail page.

The billing module 108 may validate a transaction (e.g., a successful lease and/or sale) between the user 100 and the lister 104 based on the call history information, the proxy fax number, and/or the website lead form. The billing module 108 may validate the transaction by automatically scanning (e.g., through an optical character recognition method) the call history information, the proxy fax number, and/or the website lead form to determine whether a binding contract was formed between the parties (e.g., offer, acceptance, consideration). In one embodiment, the billing module 108 may determine that there is more likely than not a binding contract formed between the parties, and on that basis an automatic signal is transmitted from the billing module 108 to an administrator of the online listing system 109 to follow up with the parties via telephone.

The billing module 108 may also generate a justification to a bill (e.g., a transaction based charge) to at least one of the user and the lister based on any one or more of the call history information, the proxy fax number, and/or the website lead form. The transaction center server 112 may route the proxy fax number to an actual fax number through the online listing system. In addition, the transaction center server 112 may convert an actual email address of the user 100 entered in the website lead form to a proxy email address, and transmit the proxy email address to the lister 104.

Furthermore, the mask module 110 of the transaction center server 112 may receive a call of the user 100 from multiple geographic sites (e.g., from the user's office and/or home location) prior to determining the identity of the user 100 dialing the proxy telephone number based on the extension number entered by the user 100. In addition, the transaction center server 112 may generate the extension based on a logic algorithm having a checksum; and bill the lister (e.g., through the billing module 108) for each different user 100 routed call to the lister 104 based on the extension.

It will be appreciated that the mask module 110 differs from the mask removal module 106 in that the mask module 110 is used to create proxy data (e.g., a proxy telephone number, a proxy email, a proxy fax number, etc. of the user 100 and/or the lister 104) from actual data while the mask removal module 106 is used to reconstruct the actual data (e.g., an actual telephone number, an actual email address, an actual fax number, etc. of the user 100 and/or the lister 104)

from the proxy data. In alternative embodiments, the mask module 110 and the mask removal module 106 may be incorporated into a single module.

Figure 2:
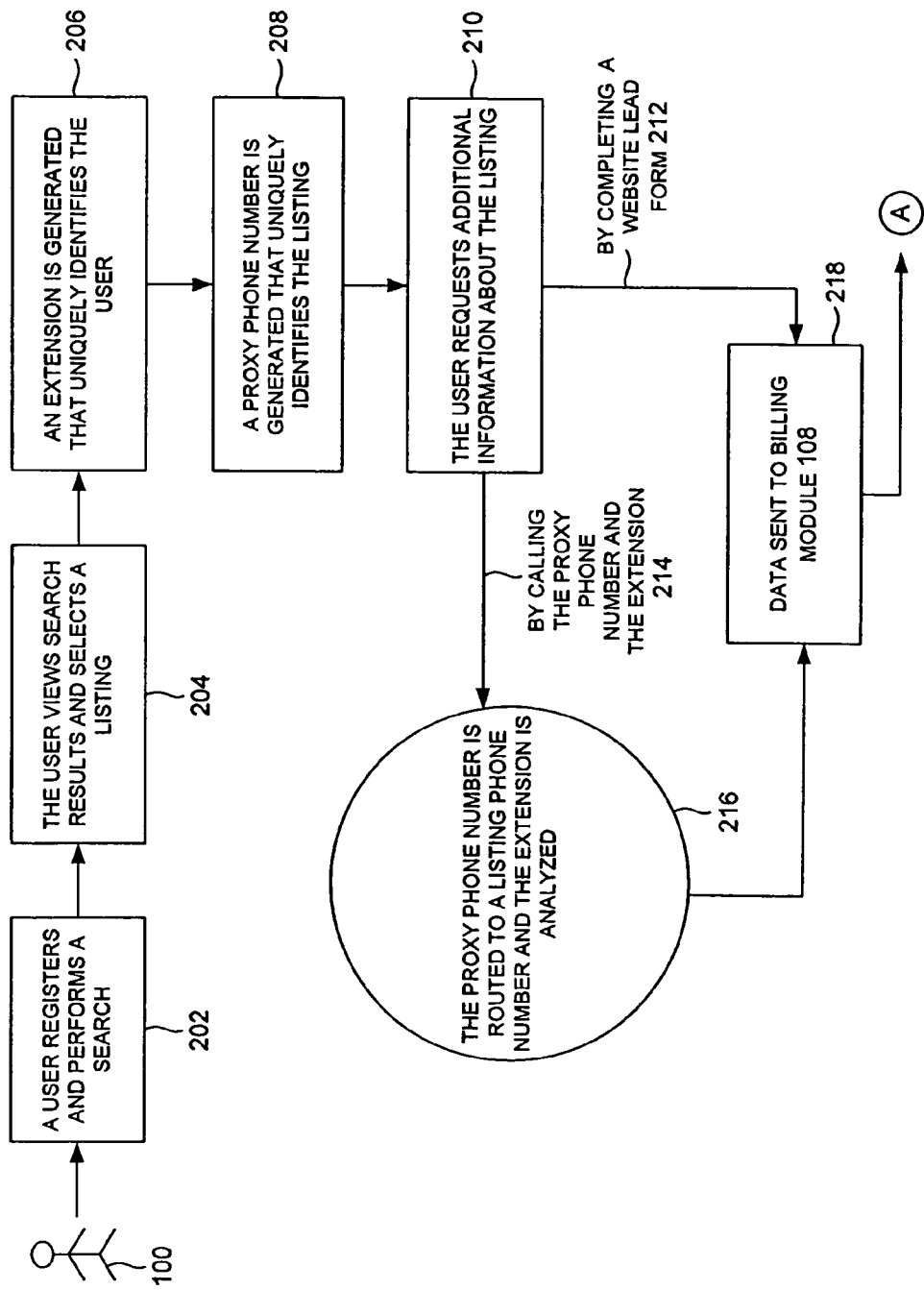
FIG. 2 is a flow chart illustrating of a user requesting additional details about a listing from a lister, according to an example embodiment.

FIG. 2 is a process view of a user requesting additional details about a listing from the lister 104 of FIG. 1, according to an embodiment. In FIG. 2, in operation 202, the user 100 registers and performs a search on the online listing system 109 of FIG. 1, according to an embodiment. Next, in operation 204, the user 100 may view search results (e.g., results matching a criteria requested by the user 100) and selects a listing (e.g., a target product/service offered by the lister 104 of FIG. 1 in the online listing system 109 of FIG. 1 that the user 100 wants to find out more about).

Then, in operation 206, an extension is generated (e.g., by the mask module 110 of FIG. 1) that uniquely identifies the user 100. In operation 208, a proxy phone number (e.g., by the mask module 110 of FIG. 1) is generated that uniquely identifies the listing (e.g., a good and/or a service posted for sale/rent/lease, etc. in the online listing system 109 of FIG. 1). In alternative embodiments, the operation 206 and the operation 208 are performed immediately after the user 100 registers and performs a search in operation 202, and the unique extension and the unique proxy telephone identifying a particular listing is visible on each and every listing visited by the user 100 in the online listing system 109 of FIG. 1.

Next, in operation 210, the user 100 requests additional information about the listing (e.g., by completing a website lead form at 212 and/or by calling the proxy phone number and the extension at 214). If the user calls the proxy phone number and the extension at 214, then the proxy phone number is routed to a listing phone number (e.g., an actual phone number of the lister 104 using the mask removal module 106 of FIG. 1) and the extension is analyzed in operation 216. Then the data is sent to the billing module 108 of FIG. 1 in operation 218 (e.g., for charging the user 100 and/or the lister 104 of FIG. 1 depending on the revenue model of the online listing system 109 of FIG. 1).

Figure 3:
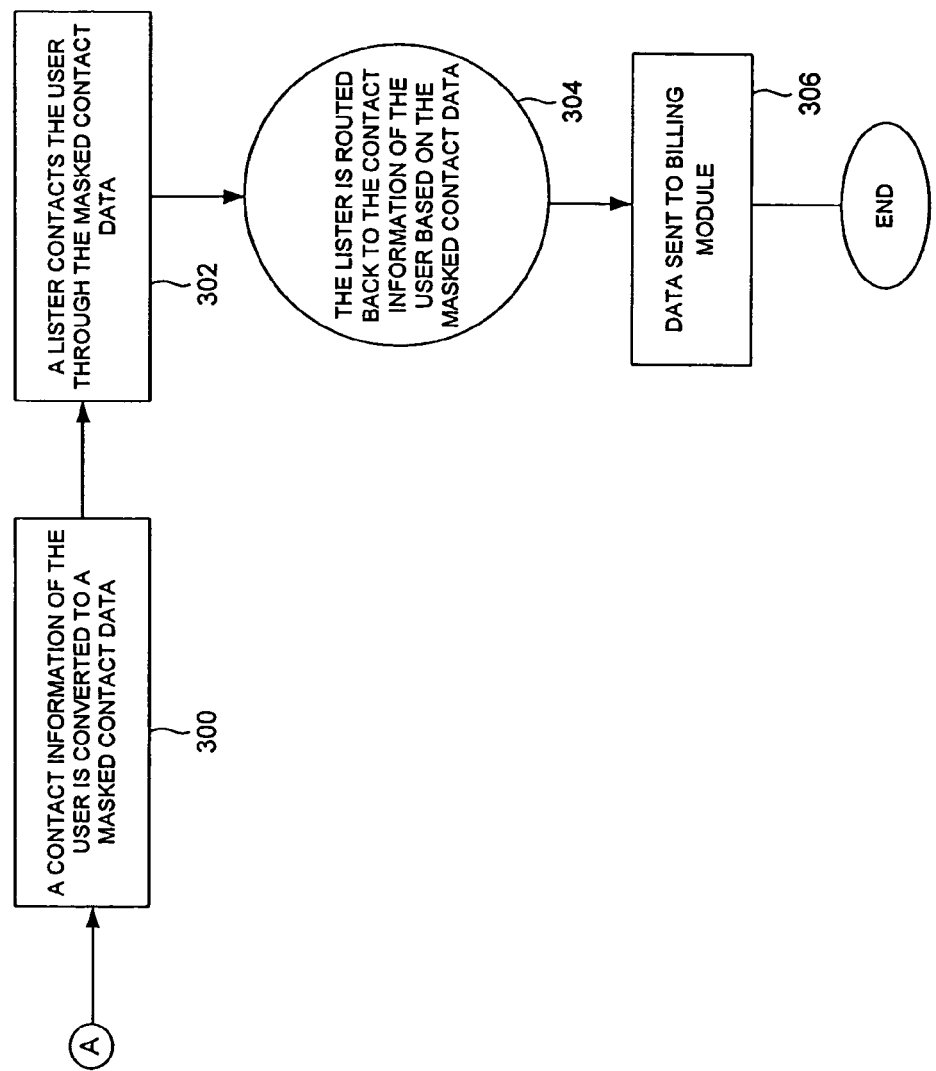
FIG. 3 is a process view of the lister of FIG. 1 responding to the user through masked contact data, according to an example embodiment.

FIG. 3 is a process view of the lister 104 of FIG. 1 responding to the user 100 through masked contact data (e.g., a proxy telephone number), according to an embodiment. In operation 300, a contact information of the user 100 is converted to a masked content data (e.g., before transmitting an email to the lister 104 of FIG. 1 with contact information details of the user 100, the mask module 110 of FIG. 1 may convert actual contact phone numbers, emails, fax machines etc. of the user 100 to masked/proxy contact phone numbers, emails, fax machines etc. using the mask table 114 of FIG. 1 in the mask database 116 of FIG. 1).

Then, in operation 302, the lister 104 of FIG. 1 contacts the user 100 through the masked contact data (e.g., the masked contact data be may be an identifier, a code, a proxy telephone number, and/or an extension entered after dialing the proxy telephone number, etc.) In operation 304, the lister 104 of FIG. 1 is routed back to the contact information of the user 100 (e.g., the actual contact information such as the actual phone number of the user 100) based on the masked content data. Then, the billing module 108 of FIG. 1 is notified of response history information (e.g., how long the lister 104 of FIG. 1 took to contact the user 100 so that the online listing system 109 of FIG. 1 can determine lead success rates, etc.) in operation 306.

Figure 5:
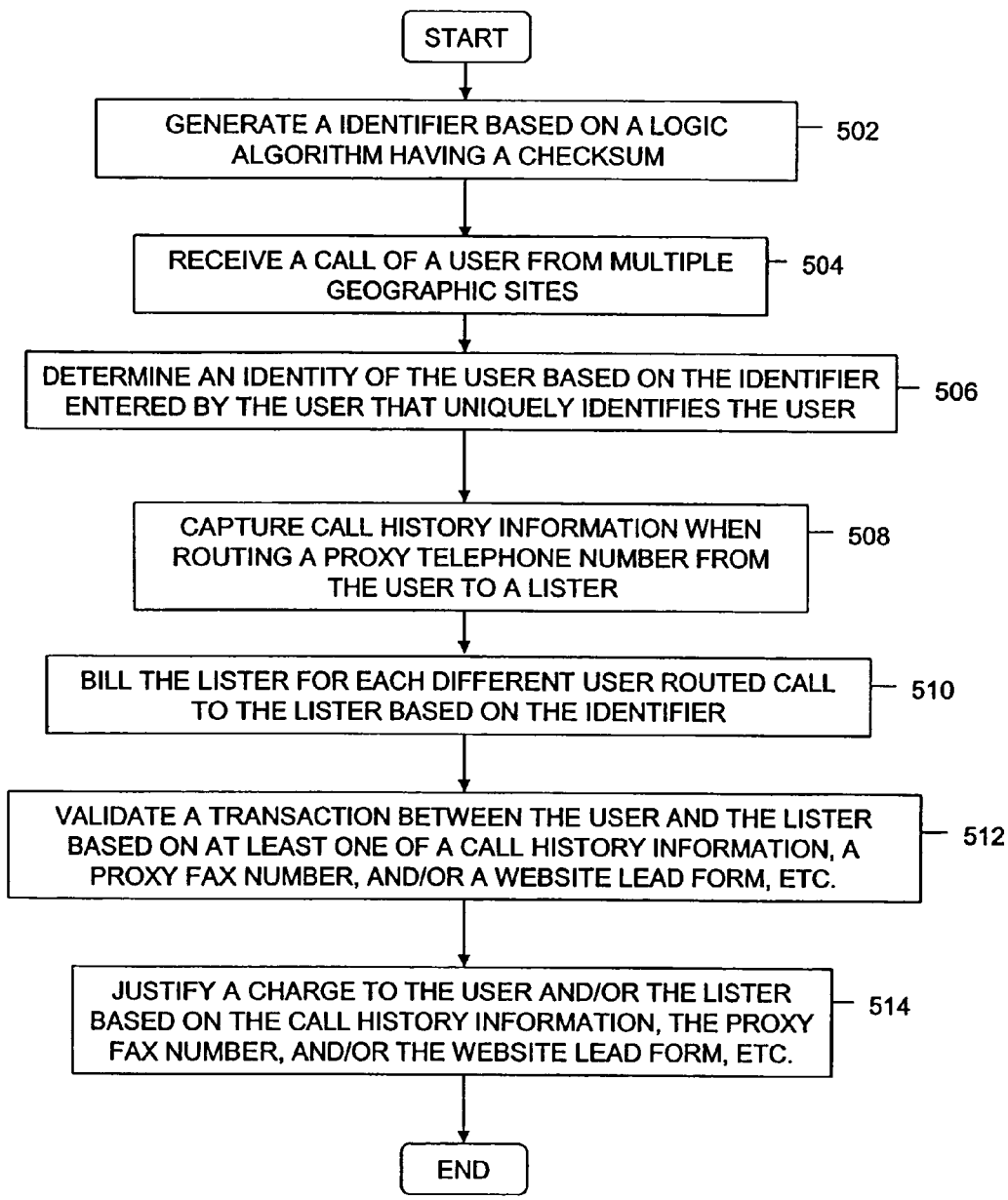
FIG. 5 is a process view of determining an identity of a user and capturing call history information when routing a proxy telephone number from the user to a lister, according to an example embodiment.

FIG. 5 is a process view of determining an identity of the user 100 of FIG. 1 and capturing call history information when routing a proxy telephone number from the user 100 to the lister 104 (e.g., see FIG. 1), according to an embodiment. In operation 502, an identifier (e.g., the identifier may be a proxy telephone number or a code entered after dialing the proxy telephone number, and may be a user identifier and/or a communication identifier) may be generated based on a logic algorithm (e.g., an intelligent algorithm that considers a geographic location of the user 100 and/or the lister 104, an income of the user 100, a budget of the user 100, etc.) the having a checksum. In operation 504, a call is received from the user 100 from multiple geographic sites. In operation 506, an identity of the user 100 may be determined based on the identifier (e.g., an extension to a proxy telephone number) entered by the user 100 that uniquely identifies the user 100.

In operation 508, call history information may be captured when routing a proxy telephone number from the user 100 to the lister 104. In one embodiment, the proxy telephone number is unique to a particular listing requested by the user 100, and the code (e.g., a telephone extension) is unique to the user 100. The proxy telephone number is converted (e.g., using the mask removal module 106) to an actual telephone number prior to routing the proxy telephone number to the lister 104.

In operation 510, the lister 104 may be billed using the billing module 108 of FIG. 1 (e.g., in other embodiments the lister 104 may not be billed, and in some embodiments the lister 104 and/or the user 100 may be billed). In one embodiment, additional information may be transmitted to the user 100 about the particular listing based on the duration of the routed call. The particular listing may be associated with an item detail page in the online listing system 109, and the user 100 may contact the lister 104 through the proxy telephone number, a proxy fax number, and/or a website lead form on the item detail page (e.g., a web page having details about a listing).

In operation 512, a transaction between the user 100 and the lister 104 may be validated based on at least one of a call history information (e.g., the call history information may include at least one of the identity of the user 100, a duration of a routed call, a time-and-day of the routed call, and a particular listing requested by the user 100), the proxy fax number and/or the website lead form, etc. In operation 514, a charge may be justified to the user 100 and/or the lister 104 based on the call history information, the proxy fax number, and/or the website lead form, etc.

In one embodiment the proxy fax number may be routed to an actual fax number through the online listing system 109 when the user 100 sends a fax to the lister 104 and/or vice versa (e.g., by the mask removal module 106 of FIG. 1). In addition, an actual email address of the user 100 entered in the website lead form may be converted to a proxy email address (e.g., by the mask module 110 of FIG. 1); and transmitted to the lister 104 of FIG. 1.

Figure 6:
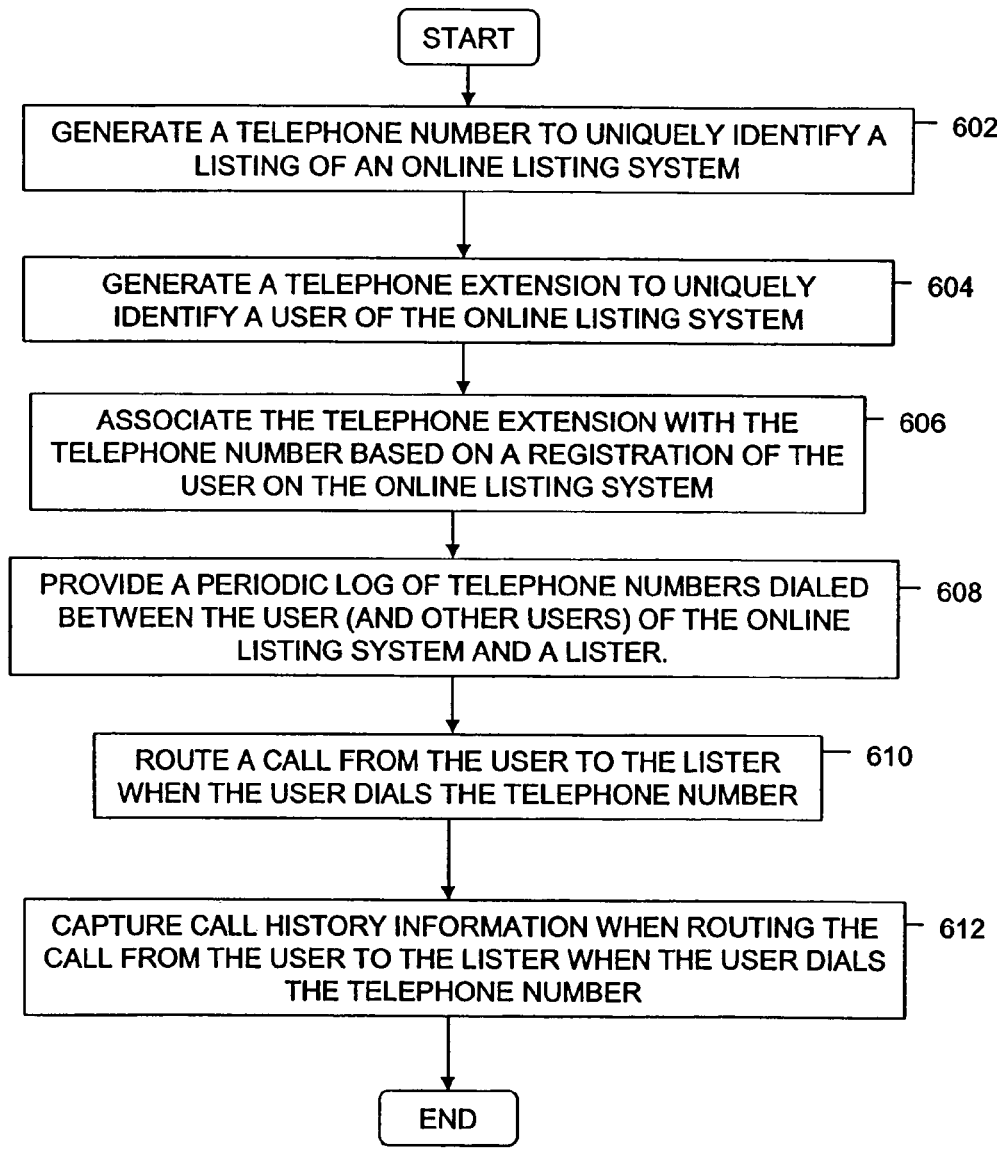
FIG. 6 is a process view of generating a telephone number to uniquely identify a listing of an online listing system, and generating a telephone extension to uniquely identify a user of the online listing system, according to an example embodiment.

FIG. 6 is a process view of generating a telephone number (e.g., a proxy telephone number) to uniquely identify a listing of an online listing system 109, and generating a telephone extension to uniquely identify a user 100 of the online listing system, according to an embodiment. In operation 602, a telephone number (e.g., a proxy telephone number) may be generated to uniquely identify a listing of the online listing system 109. In operation 604, a telephone extension may be generated to uniquely identify the user 100 of the online listing system 109.

In operation 606, the telephone extension may be associated with the telephone number based on a registration of the user on the online listing system (e.g., as described in operation 202 of FIG. 2). In operation 608, a periodic log may be provided of telephone numbers dialed between users (e.g., the user 100 and other users) of the online listing system 109 of FIG. 1 and the lister 104 of FIG. 1. In operation 610, a call may be routed from the user 100 to the lister 104 when the user 100 dials the telephone number. In operation 612, call history information (e.g., length and duration of the call, time of call, etc.) may be captured when routing the call from the user 100 to the lister 104 when the user 100 dials the telephone number.

Figure 7:
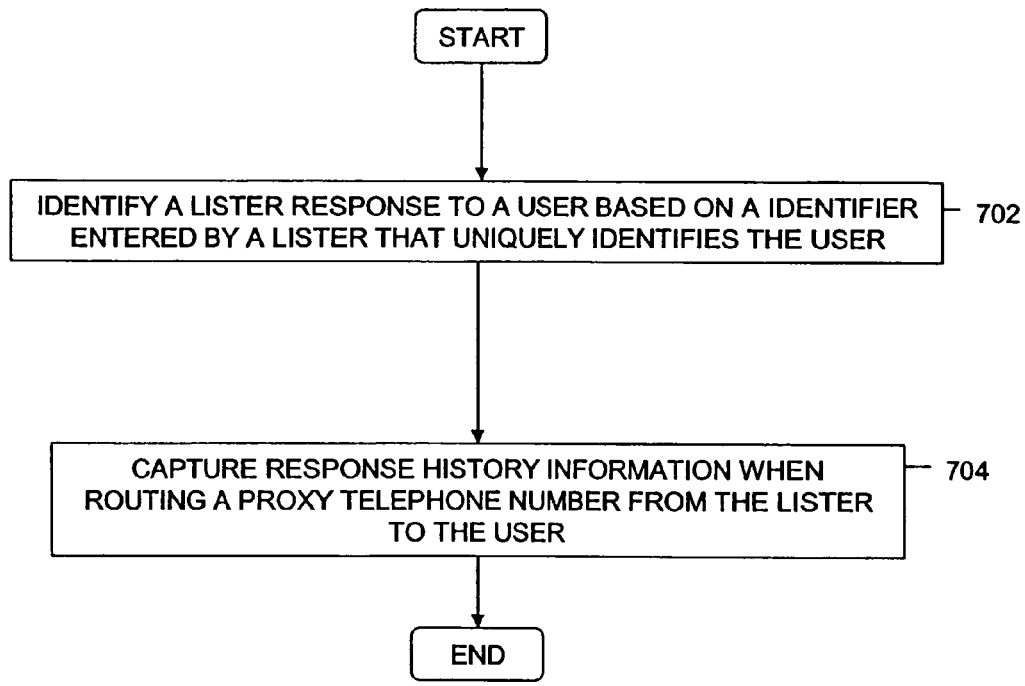
FIG. 7 is a process view of identifying a lister response and capturing response history information when routing a proxy telephone number from a lister to a user, according to an example embodiment

FIG. 7 is a process view of identifying a lister response and capturing response history information when routing a proxy telephone number from the lister 104 to the user 100 (e.g., dialed by the lister 104 to the user 100), according to an embodiment. In operation 702, a lister response (e.g., the lister response may be a landlord following up to a lead from a prospective tenant, a mortgage broker following up to a prospective mortgagor etc.) to the user 100 (e.g., as described in the process view of FIG. 5) may be identified based on an identifier (e.g., a code, a proxy telephone number, and/or the code entered after the proxy telephone number) entered by the lister 104 that uniquely identifies the user 100 (e.g., in alternate embodiments may uniquely identify the user, lister, and/or a combination of the user and/or lister). In one embodiment, the proxy telephone number is unique to a particular listing requested by the user, and the code is unique to the user. In operation 704, a response history (e.g., duration of the call, which salesperson called back the user 100, when the salesperson called back in light of the original call from the user 100, etc.) may be captured when routing a proxy telephone number (e.g., a mask of the actual phone number) from the lister 104 of FIG. 1 to the user 100 of FIG. 1. Additionally, in one embodiment, the identifier may uniquely identify the user 100 and a particular call made by the user 100 to the lister 104.

Referring now to FIG. 1, in one embodiment, a periodic log of telephone numbers dialed between the user 100 and other users of the online listing system 109 and the lister 104 is provided to the billing module 108 of FIG. 1. The billing module 108 may calculate how long the lister of the online listing system 109 took to respond to the user (e.g., for sales tracking, response rate, incentive tracking, etc.). The billing module 108 may also charge either the user 100 and/or the lister 104 and/or a third party (e.g., a referral service) based on a verified and justified transaction in one embodiment (e.g., verified based on the call logs, email responses, etc. between the parties).

In addition, a call may be routed (e.g., through a circuit switched network and/or IP network associated with the mask removal module 106 of FIG. 1) when the user 100 and/or the lister 104 communicate with each other through a proxy telephone number. One or more telephone calls between the user and the lister may be recorded based on a contract (e.g., a binding and/or non-binding online/offline contract) between the user 100 and the lister 104 with a proprietor of the online listing system 109.

It should be noted that the embodiments disclosed herein may be embodied in a machine-readable-medium. The term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Although the present embodiments have been described with reference to specific example embodiments, it will be evident that various modifications and changes may be made to these embodiments without departing from the broader spirit and scope of the embodiments. It will be appreciated that the various operations and processes disclosed herein may be performed in any order, and are not to be limited to a particular order of events unless explicitly specified that the order is important. In addition, the various modules, analyzers, generators, etc. described herein may be performed and created using hardware circuitry (e.g., CMOS based logic circuitry) as well as in software.

For example, the online listing system 109, the mask module 110, the extension generator module 140, the billing module 108, and/or the mask removal module 106, etc of FIG. 1 may be embodied using transistors, logic gates, and electrical circuits (e.g., application specific integrated ASIC circuitry) using a transaction center circuit, a mask circuit, an extension generator circuit, a billing circuit, and/or a mask removal circuit, etc. In addition, it will be appreciated that the various operations, processes, and methods disclosed herein may be embodied in a machine-readable medium and/or a machine accessible medium compatible with a data processing system (e.g., a computer system). Accordingly, the specification and drawings are to be regarded in an illustrative rather than a restrictive sense.

What is claimed is:

1. A computer-implemented method of operating an online listing system, the computer-implemented method including:
   determining, by a processor, an identity of a user based on an identifier entered by the user that uniquely identifies the user;
   capturing, by the processor, call history information when routing a call to a proxy telephone number by the user to a lister, a first part of the proxy telephone number being the same for the user and one or more additional users of the online listing system;
   upon completion of the routed call,
      transmitting, to the user, additional information about a listing based on a duration of the routed call, the additional information describing an item or service offered by the lister;
      scanning the call history information to determine whether a contract associated with the listing is formed between the user and the lister; and
      validating a transaction associated with the listing based on the determination that the contract is formed between the user and the lister.

2. The computer-implemented method of claim 1, wherein the identifier forms a second part of the proxy telephone number.

3. The computer-implemented method of claim 1, wherein the identifier is a code entered after dialing the proxy telephone number.

4. The computer-implemented method of claim 3, wherein the proxy telephone number is unique to a listing associated with the lister, and the code is unique to the user.

5. The computer-implemented method of claim 4, wherein the listing is associated with an item detail page in the online listing system, and wherein the user contacts the lister through any one or more of the proxy telephone number, a proxy fax number, and a website lead form on the item detail page.

6. The computer-implemented method of claim 5, further including justifying a charge to at least one of the user and the lister based on any one or more of the call history information, the proxy fax number, and the website lead form.

7. The computer-implemented method of claim 3, further including converting the proxy telephone number to an actual telephone number prior to routing the call made to the proxy telephone number by the user to the lister.

8. The computer-implemented method of claim 3, wherein the call history information includes at least one of the identity of the user, the duration of a routed call, a time-and-day of the routed call, and a listing identifier identifying the listing associated with the lister.

9. The computer-implemented method of claim 1, further including routing a fax to the proxy fax number to an actual fax number through the online listing system.

10. The computer-implemented method of claim 9, further including converting an actual email address of the user entered in the website lead form to a proxy email address; and transmitting the proxy email address to the lister.

11. The computer-implemented method of claim 1, further including receiving the call of the user from multiple geographic sites prior to determining the identity of the user based on the identifier entered by the user that uniquely identifies the user.

12. The computer-implemented method of claim 1, further including generating the identifier based on a logic algorithm having a checksum; and billing the lister for each different user routed call to the lister based on the identifier.

13. The computer-implemented method of claim 1, further including:
identifying a lister response to the user based on a code entered by the lister dialing a further proxy telephone number; and
capturing a response history information when routing a call to the further proxy telephone number to the user.

14. The computer-implemented method of claim 13, wherein the code is an extension entered after dialing the further proxy telephone number.

15. The computer-implemented method of claim 13, wherein the response history includes data of how long the lister took to contact the user.

16. The computer-implemented method of claim 15, further including recording one or more telephone calls between the user and the lister based on an agreement between the user and the lister with a proprietor of the online listing system.

17. The computer-implemented method of claim 16, further including providing a periodic log of telephone numbers dialed between the user and the lister.

18. A machine-readable storage medium having embodied thereon a set of instructions executable by a machine to perform the method of claim 1.

19. The computer-implemented method of claim 1, wherein the additional information is transmitted using additional user data that uniquely identifies the user.

20. The computer-implemented method of claim 1, further including: responsive to determining that a contract is formed between the user and the lister, transmitting a signal to an administrator of the online listing system to follow up with the user and the lister.

21. The computer-implemented method of claim 1, wherein the call history information is scanned using an optical character recognition process.

22. A computer-implemented method including:
generating, by a processor, a telephone number to uniquely identify a listing of an online listing system, the telephone number being the same for one or more users;
generating, by the processor, a telephone extension to uniquely identify a user of the one or more users of the online listing system;
associating the telephone extension with the telephone number based on a registration of the user on the online listing system; and
upon completion of the routed call, transmitting, to the user, additional information about a listing based on a duration of a routed call, the additional information describing an item or service offered by the lister.

23. A machine-readable storage medium having embodied thereon a set of instructions executable by a machine to perform the method of claim 22.

24. The computer implemented method of claim 22, wherein the telephone extension that uniquely identifies the user and the telephone number that uniquely identifies the listing is visible on each listing in the online listing system visited by the user.

25. A computer-implemented method of operating an online listing system including:
identifying, by a processor, a lister response to a user based on a identifier entered by a lister that uniquely identifies the user;
capturing, by the processor, response history information when routing a call to a proxy telephone number from the lister to the user;
upon completion of the routed call, transmitting, to the user, additional information about a listing based on the duration of the routed call, the additional information describing an item or service offered by the lister;
scanning a call history information between the user and the lister to determine whether a contract associated with the listing is formed between the user and the lister; and
validating a transaction associated with the listing based on the determination that the contract is formed between the user and the lister.

26. A machine-readable storage medium having embodied thereon a set of instructions executable by a machine to perform the method of claim 25.

27. An apparatus including:
a transaction center server to identify a lister response to a user based on a code entered by the lister dialing a proxy telephone number to place a call to the user and upon completion of the call, to transmit, to the user, additional information about a listing based on the duration of the call, the additional information describing an item or service offered by the lister; and
a billing module to capture a response history information when routing a call to the proxy telephone number to the user and validate a transaction associated with the listing by scanning a call history information to determine if a contract associated with the listing is formed between the user and the lister.

28. The apparatus of claim 27, wherein the code is an extension entered after dialing the proxy telephone number.

29. The apparatus of claim 27 further including a mask module to determine an identity of the user dialing the proxy telephone number based on an extension number entered by the user, and wherein the transaction center server is to capture the call history information when routing the call to the proxy telephone number to the lister.

30. The apparatus of claim 29, wherein the proxy telephone number is unique to the listing requested by the user, and the extension number is unique to the user.

31. The apparatus of claim 30, wherein the billing module is to generate a justification to a bill to at least one of the user and the lister based on any one or more of the call history information, the proxy fax number, and the website lead form.

32. A system including:
means for identifying, by a processor, a lister response to a user based on a identifier entered by a lister that uniquely identifies the user;

means for capturing by the processor, response history information when routing a call made to a proxy telephone number from the lister to the user;

means for transmitting, to the user upon completion of the routed call, additional information about a listing based on the duration of the routed call, the additional information describing an item or service offered by the lister;

means for scanning a call history information to determine whether a contract associated with the listing is formed between the user and the lister; and means for validating a transaction associated with the listing between the user and the lister based on the determination that the contract related to the listing is formed between the user and the lister.

* * * * *